B. M. W. HANSON.
METAL REDUCING MACHINE.
APPLICATION FILED OCT. 25, 1915.

1,219,305.

Patented Mar. 13, 1917.
9 SHEETS—SHEET 1.

B. M. W. HANSON.
METAL REDUCING MACHINE.
APPLICATION FILED OCT. 25, 1915.

1,219,305.

Patented Mar. 13, 1917.
9 SHEETS—SHEET 8.

Inventor
B. M. W. Hanson
By Hutt Litchland
Atty

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

METAL-REDUCING MACHINE.

1,219,305.

Specification of Letters Patent.

Patented Mar. 13, 1917.

Application filed October 25, 1915. Serial No. 57,641.

*To all whom it may concern:*

Be it known that I, BENGT M. W. HANSON, a citizen of the United States, residing at Hartford, in the county of Hartford and State of Connecticut, have invented certain new and useful Improvements in Metal-Reducing Machines, of which the following is a specification.

This invention relates to metal-reducing machines. A metal-reducing machine involving my invention, can be employed for different purposes. In the drawings accompanying and forming part of the present specification I have represented in detail one of the several convenient forms of embodiment of the invention, which I will set forth fully in the following description. I do not restrict myself to this particular disclosure; I may depart therefrom in several respects within the scope of the invention defined by the claims following said description.

In said form of embodiment of the invention the machine is shown organized for grinding, although it may not be necessary in all cases that the tool by which reducing is accomplished, should be a grinding wheel or analogous device. One of the fundamental objects of the invention is the provision of means of an effective character by which the machine is adapted to reduce with accuracy and precision work of different natures. As two of many illustrations I might mention a plain pulley and a stepped pulley, the former typifying what might be considered plain or regular work and the latter irregular work. In the present instance the machine is convertible, means being provided whereby it may at will, be conditioned for properly performing either of its desired functions. There are other features of novelty and advantage, which with the foregoing will be fully stated in my description.

Referring to said drawings.

Like characters refer to like parts throughout the several views, which are on different scales.

As may be inferred from what has been noted, the invention can with advantage, be incorporated in machines of various kinds, although the same is of especial utility when embodied in a grinding-machine. I have already alluded to the fact that by the machine two different kinds of work which in some respects materially differ in form, can be reduced on the same machine, so that the latter is of compound type. There is a tool which may, as will be obvious, and preferably does, take the form of a grinding-member such as an emery wheel, and means for supporting the work, in conjunction with means by which the work and the tool can at will be moved relatively toward and from each other or whereby the work and tool can be relatively reciprocated to cause the tool to traverse the work, and in the latter event to also cause a relative step-by-step approach to the work and the tool at predetermined points preferably at the conclusion of each half of the reciprocation. When a stepped pulley is being reduced, means will be brought into action for causing a relative approach of the tool and the work, the tool in this event preferably grinding across the entire transverse extent of the periphery of the tool. When, however, a plain pulley is being ground, the tool is relatively caused to traverse the periphery of the pulley, and at the conclusion of each traverse, the tool and the work are caused to automatically approach each other. It will be, of course, obvious that I can reduce articles of widely-different characters on the machine, merely having mentioned pulleys as presenting two different kinds of work in conjunction with which the machine operates in an eminently satisfactory manner. Preferably, although not essentially, the tool occupies a fixed relation. It is also preferably rotative. In such case, therefore, it also follows that the best effects are secured through the movement of the work for instance, by the proper action of work-supporting means.

Figure 2:
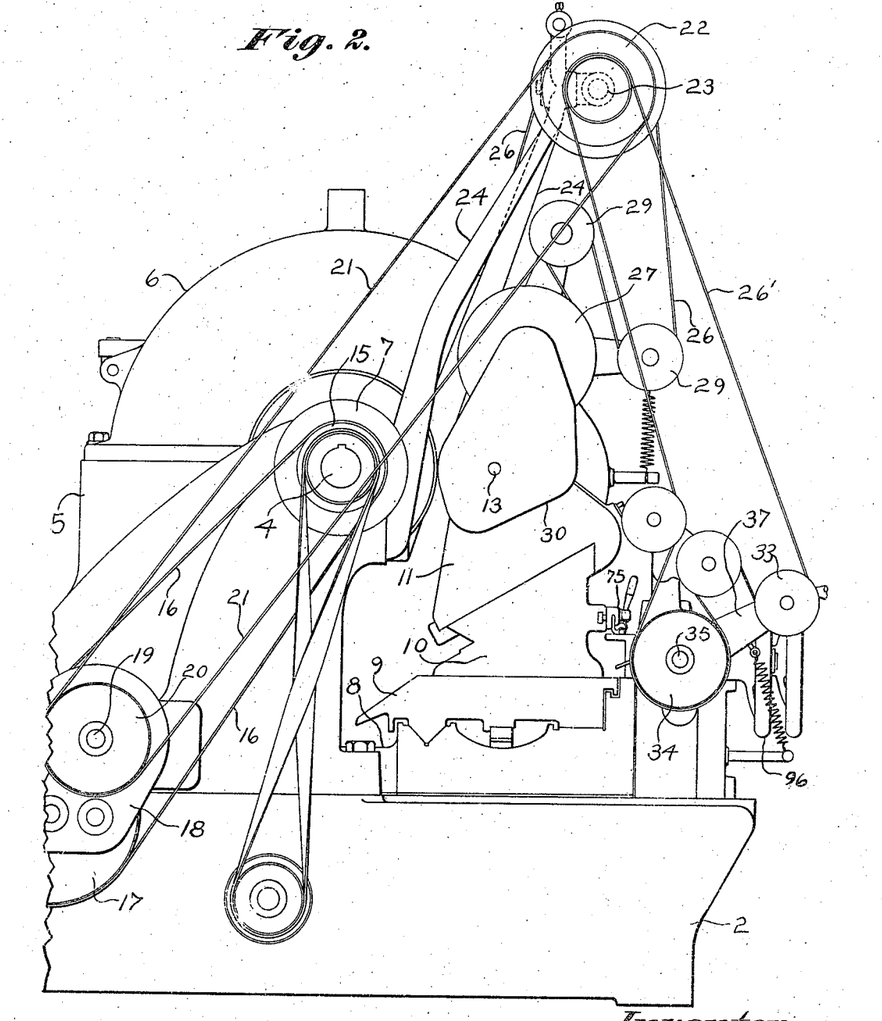
Fig. 2 is an elevation as seen from the left in Fig. 1, the rear portion of the machine being broken away.
Figure 3:
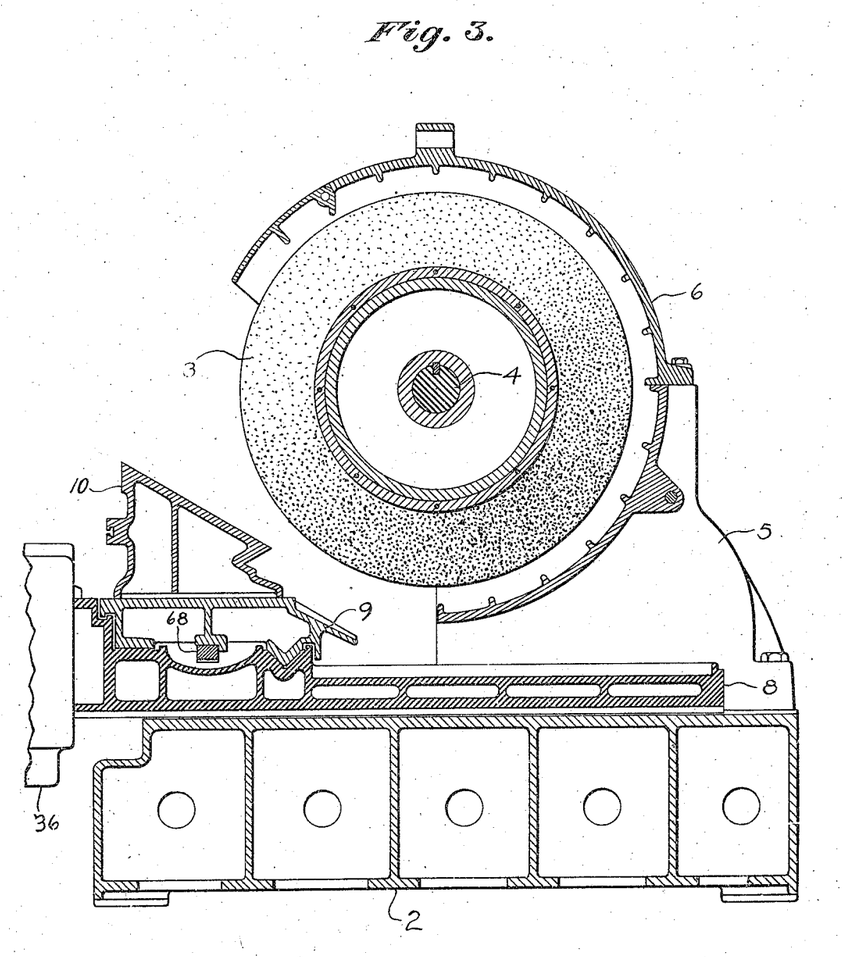
Fig. 3 is a transverse section on the line 3—3 of Fig. 1, looking in the direction of the arrow.

The framework for supporting the different parts of the machine may be of any suitable nature. That shown comprises the base or bed 2. The tool shown consists of a grinding-wheel 3 of emery or other suitable substance (see Figs. 1 and 3 for example.) This grinding-wheel as represented is fastened as by keying, to a shaft as 4 (see also Fig. 2), said shaft being supported for rotation by a bearing as 5 bolted or otherwise suitably fastened to the upper side of the base or bed 2. As illustrated the bearing is equipped with a guard 6 partly surrounding the wheel 3 to prevent spattering or scattering of the particles and other foreign matter produced at the grinding zone. The shaft 4 and therefore, the grinding wheel 3 may be rotated in any desirable manner, for instance by the pulley 7 (Fig. 2) adapted to be belted to an electric motor not shown, and keyed or otherwise fastened to said shaft 4. In the present instance and as will hereinafter appear the moving parts are operated through the initial intervention of the shaft 4 which presents the main or primary shaft of the machine.

Figure 1:
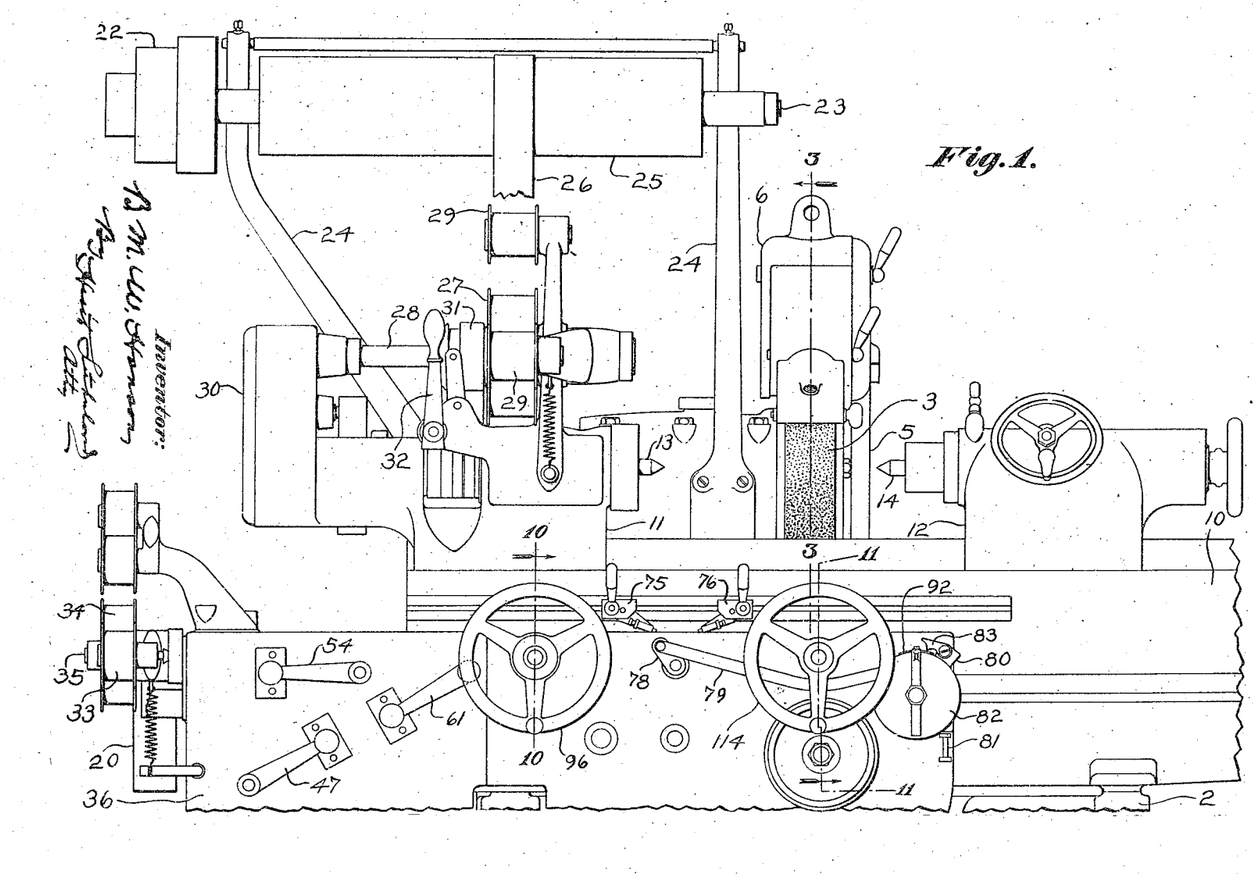
Figure 1 is a front elevation of the upper portion of a metal-reducing machine involving my invention, the right side of the machine being broken away.

The work carrying means in the present case is of compound nature comprising in its organization a main carrier as 8 and an auxiliary carrier as 9, the latter in the construction shown being mounted on the former. As represented the bed 2 has suitable ways between its ends for supporting the main carrier or carriage 8 for sliding movement crosswise of the bed. The main carrier or carriage 8 as illustrated, is provided in turn with ways for supporting the auxiliary carrier or table for sliding movement longitudinally of the bed 2 as shown for instances in Figs. 1, 2, 3, 7, 8 and 9. Mounted on and suitably rigidly connected with the auxiliary carrier 9 is the member 10 to which are connected the head and tail stocks 11 and 12 provided with the live and dead spindles 13 and 14 respectively. (Fig. 1). These head and tail stocks and their spindles 13 and 14 are provided with the usual adjuncts for effecting adjustments of the same, which being old and constituting no part of the invention, require no detailed description. The two spindles 13 and 14 present a convenient means for supporting the work, and when the spindle 13 is rotated the work will also be rotated. I might note at this time that in grinding I prefer to rotate both the work and the grinding tool 3. The means shown by which the spindle 13 is rotated will be hereinafter more particularly described.

Fastened suitably to the shaft or arbor 4 (Fig. 2) is a stepped pulley 15 connected by a belt 16 with the stepped pulley 17 connected in turn by gearing inclosed in the box 18 with the shaft 19 of the pulley 20, this boxing 18 and the shafts for the pulleys 17 and 20 being supported suitably by the rear side of the bed 2. The pulley 20 is connected by the belt 21 with the stepped pulley 22 fastened to the shaft 23 supported by bearings 24 rising from and suitably fastened to the base or bed 2. Between the uprights or standards 24 and fastened to the shaft 23 is the drum 25 (Fig. 1) around which the belt 26 is passed, said belt being also passed around the pulley or band wheel 27 (Figs. 1 and 2) loose on the shaft 28, the belt 26 between the drum 25 and the band wheel 27 passing around suitably positioned idlers as 29, some of which as illustrated may be yieldingly mounted. This shaft 28 is supported by bearings on the longitudinally movable or auxiliary carrier 9. The shaft 28 is connected by gearing in the box 30 with the live spindle 13. The clutch 31 (Fig. 1) may be utilized to clutch the band wheel or pulley to the shaft 28, said clutch 31 being operative by the hand lever 32. When the pulley or band wheel 27 is clutched to the shaft or arbor 28, it will be clear that the spindle 13 through the intervention of the described parts will be rotated, this regardless of the longitudinal movement of the auxiliary carrier or table 9, the belt 26 sliding along the drum 25 on the longitudinal movement of said carrier or table 9.

In grinding a stepped pulley or equivalent object susceptible to operation by the machine, the feed of the work and the tool relatively toward each other is a constant one, there being in the present case no relative lateral movement of the two or in a direction corresponding to their axes of rotation. In the present case this particular result is obtained solely by the motion of the main slide or carriage 8. In grinding a plain pulley or similar article, there is a compound motion, there being initially a relative movement of the tool and the work toward each other and also a relative lateral movement. In grinding a plain pulley or equivalent piece of work the work is fed toward the tool and at the conclusion of a predetermined amount of advancing movement of the work, the work is moved laterally or in a direction conforming to the axis of rotation of the tool and of the work, both of which as already noted preferably rotate. In the organization shown in grinding a plain pulley or analogous device, the movement of the work toward the tool is accomplished by the movement of the slide 8, while the lateral movement of the work is secured through the motion of the slide 9.

Figures 4, 5:
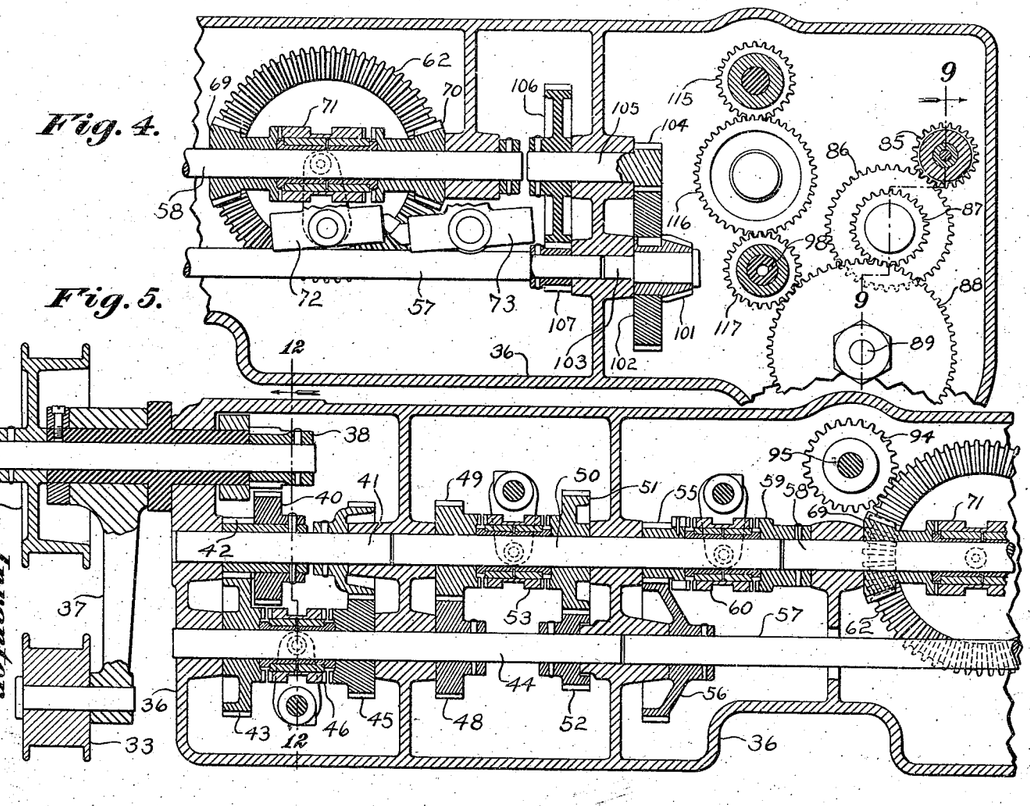
Fig. 4 is a sectional view as seen from the front showing a part of the carriage reciprocating and reversing mechanism and certain gears hereinafter more particularly described.
Fig. 5 is a practically similar view, the carriage reciprocating and reversing gearing of Fig. 4 being shown on the right in Fig. 5 which at the left illustrates some of the change gears.

The belt 26′ passes around the yieldingly-mounted idler 33, and also around the pulley 34 (Figs. 2 and 5), said pulley 34 being fastened to the shaft 35 extending into the gear box 36 suitably mounted on and rigidly connected with the main or cross slide 8. This shaft 35 projects into said box and presents a suitable support for the arm 37 which sustains the idler 33. It will, therefore, be clear that if the drum be in motion the shaft 35 through the described connections will be rotated. Fastened to the inner end of the shaft 35 is the pinion 38 (Fig. 12) in mesh with the idler pinion 39 which in turn meshes with the spur gear 40, these several gears and others to be hereinafter described being situated in the gear box 36. The gear 40 is pinned or otherwise suitably connected with the shaft 41, being rigid with the pinion 42 (Fig. 5) in mesh with the gear 43 loose on the shaft 44. Complemental to the gear 43 is the gear 45, the clutch member 46 rotative with the shaft 45 being slidable longitudinally of said shaft 44 to alternately couple the gears 43 and 45 thereto, the hand lever 47 on the front of the boxing 36 being provided for the operation of said clutch member 46. The shaft 44 rigidly carries the spur gear 48 in mesh with the spur gear 49 loose on the shaft 50, coaxial with the shaft 41 (Fig. 5). Complemental to the gear 49 and also loose on the shaft 50 is the spur gear 51 meshing with the pinion 52 which like the gear 48 is fastened as by pinning, to the shaft 44. Between the loose gears 49 and 50 is the clutch member 53 operative by the hand lever 54 on the front of the box 36 and by which the gears 49 and 51 can be alternately clutched to the shaft 50. Loose on the shaft 50 is the gear 55 in mesh with the spur gear 56 fastened to the shaft 57. Coaxial with the shaft 50 is the shaft 58 to which is pinned or otherwise suitably connected the clutch section 59. Between the gear 55 presenting a clutch section, and the clutch section 59 is the clutch member 60 operative by the hand lever 61 on the front of the box 36, and this hand lever 61 can be utilized to clutch the gear 55 to the shaft 50 or the clutch section 59 to said shaft 50. It will be understood that the clutch member 60 rotates with the shaft 50, and it will be assumed that said shaft 50 is in rotation. To operate the shaft 58 the clutch member 60 will be engaged with the clutch section 59, and it will be clear that when the shaft 58 is turned, the shaft 57 will be at rest. To reverse this relation the clutch member 60 will be engaged with the gear or clutch section 55. In the latter event the gear 55 and therefore the gear 56 will be rotated to effect the rotation of the shaft 57. As will hereinafter appear there are two mechanisms by which the simple or compound motion to which I have alluded can be effected. One of these mechanisms receives its effect from the shaft 58 and the other from the shaft 57, and the clutch member 60 presents a convenient means for throwing said mechanism alternately into action at will. When one mechanism is in action, there will be merely a movement of the work toward the tool, whereas when the other is in action, there will be a movement of the work toward the tool and a lateral movement. I have described means of a simple nature by which variations in speed of the shafts 57 and 58 can be conveniently accomplished.

Mounted in the box 36 is the bevel gear 62 keyed or otherwise suitably fastened to the short or stub shaft 63 rotative in the inner wall of said box. There is rigid with the inner end of the stub shaft 63 the pinion 64 (Fig. 8) in mesh with the spur gear 65 pinned or otherwise suitably connected to the shaft 66 supported by and extending transversely of the carriage or main slide 8. Rigid with the inner end of the shaft 66 is the pinion 67 in mesh with the rack 68 fastened to the table or auxiliary slide 9. The bevel gear 62 is oppositely rotative; when it is rotated in one direction it causes a movement, through the intermediate described parts, of the table 9 in one direction, whereas when said bevel gear 62 is oppositely rotated reverse movement of said table through said described parts will follow.

Figure 6:
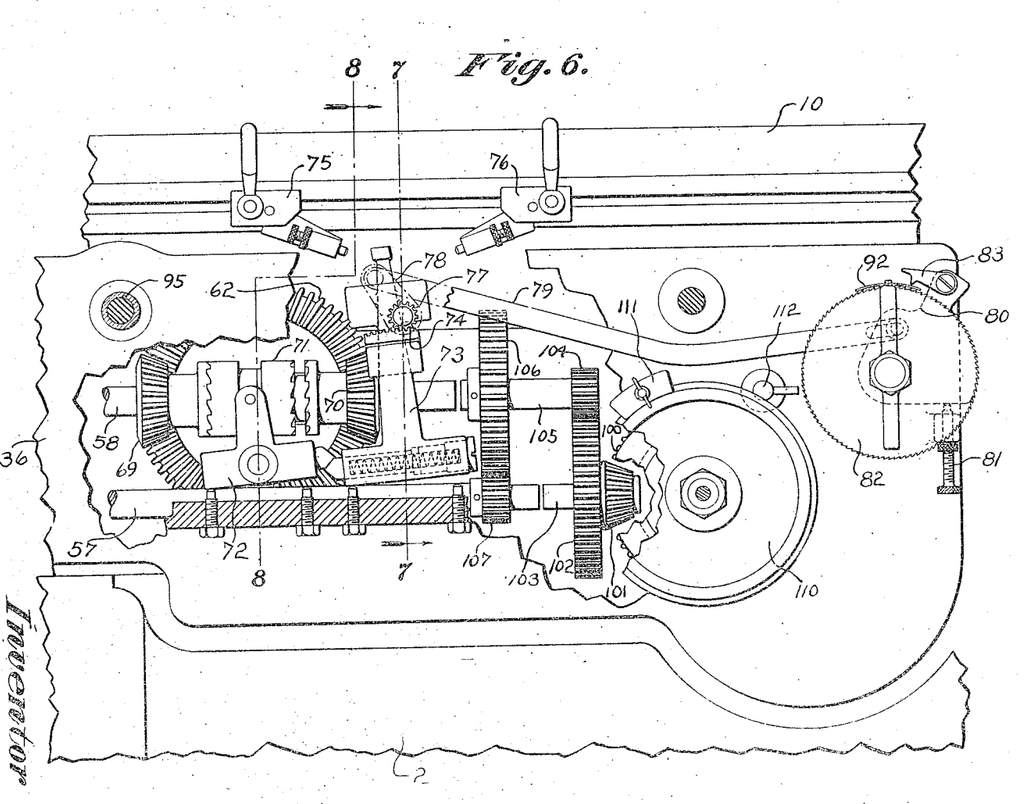
Fig. 6 is a front elevation partly in section and with portions broken away, of the carriage reciprocating and reversing mechanism, the dogs by which the carriage is reversed, the means by which the cross feed is regulated, and certain other elements of the feeding and controlling mechanism.
Figure 7:
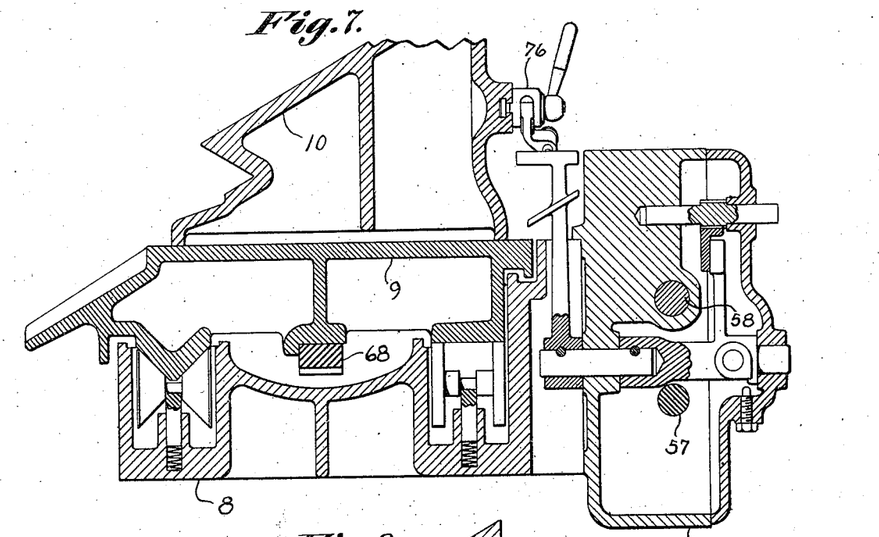
Figs. 7 and 8 are cross sections on the lines 7—7 and 8—8 respectively of Fig. 6, looking in the direction of the arrow.
Figure 8:
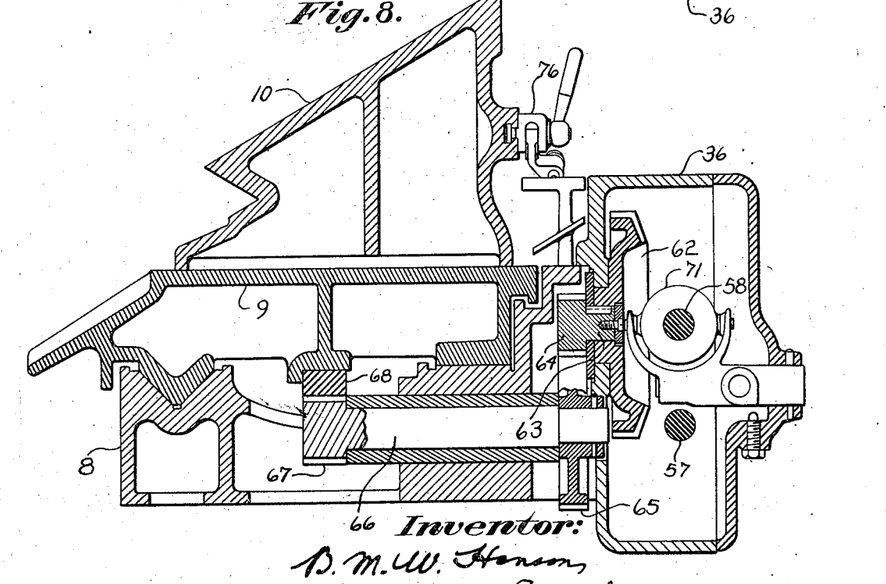

The shaft 58 (Fig. 4) loosely carries the bevel pinions 69 and 70 in mesh with the bevel gear 62. Between these bevel pinions is the clutch member 71 slidable on and rotative with the shaft 58, said clutch member 71 being adapted to alternately clutch the bevel pinions 69 and 70 to the shaft 58 to effect, as will be apparent opposite movements of the table 9 longitudinally of the bed 2. Coöperative with the clutch member 71 is the shifter 72 mounted for rocking movement and operated by the actuator 73 as familiar in this art. The actuator 73 is supported for rocking movement and has at its upper end the segment 74, the function of which will be hereinafter explained. The upper free end of the actuator 73 is in the path of the dogs 75 and 76 connected with the table 9 for longitudinal adjustment as also familiar in this art, the dogs 75 and 76 being adapted to alternately rock the actuator 73. In Fig. 6 the clutch member 71 is in engagement with the bevel pinion 69 to effect through the parts already described movement of the table or auxiliary slide 9 longitudinally of the bed 2. When the table has practically completed such movement, the dog 75 will strike the upper end of the actuator 73 and will swing over said actuator 73, so that the latter in turn will operate the shifter 72 to disengage the clutch member 71 through the pinion 69 and cause said clutch member to engage the bevel pinion 70, this motion being completed practically when the movement stated of the table 9 has been completed, so that when the clutch member 71 engages the pinion 70, the motion of the table 9 will be reversed. When the reverse movement of the table 9 has been practically completed the clutch member 71 will be caused to engage the pinion 69 to again reverse the movement.

Figure 9:
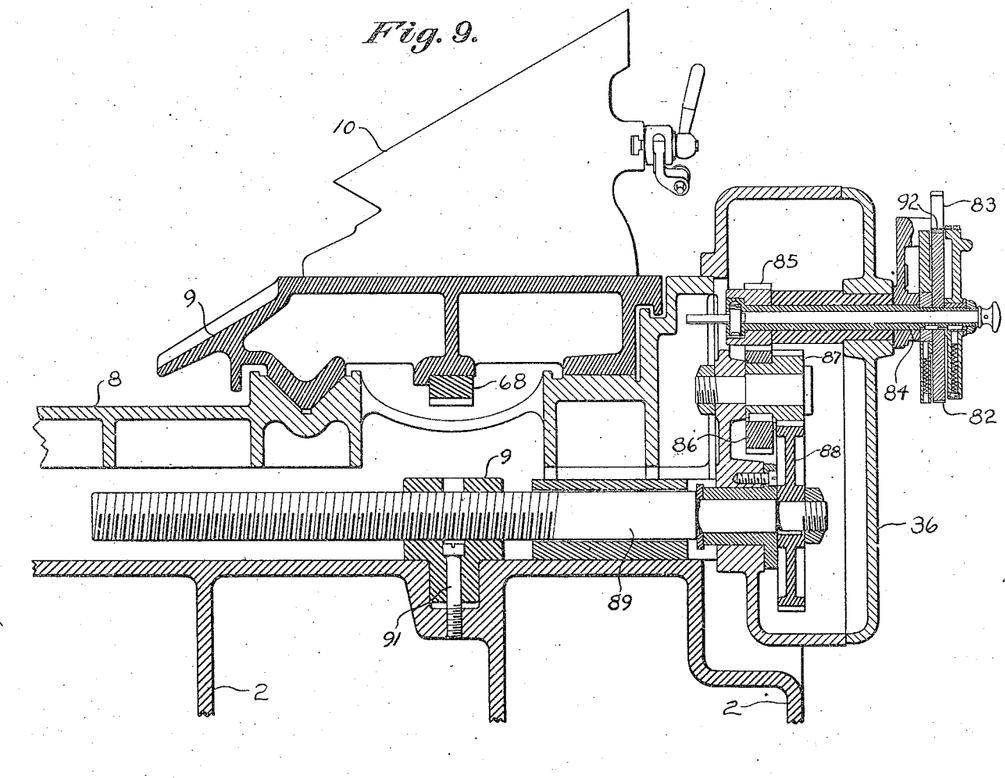
Fig. 9 is a transverse section showing cross feeding means and certain coöperative elements.

In mesh with the segment 74 is the pinion 77 to the shaft of which the crank arm 78 is connected, the link 79 being pivoted to said crank arm and in turn loosely connected with the rocker 80 (Figs. 6 and 9 for example). The stroke of this rocker is governed as by the screw 81, the length of movement of the rocker 80 governing the amount of movement of the ratchet wheel 82. This ratchet wheel and rocker, the coöperating pawl 83 and certain of their adjuncts are familiar in this art and therefore, require but a brief description. The ratchet wheel 82 is mounted on the hollow shaft 84. Fastened to the inner end of the shaft 84 is the pinion 85 in mesh with the spur gear 86 with which the pinion 87 (Fig. 9) is rotative. The pinion 87 meshes in turn with the spur gear 88 fastened to the shaft 89, said shaft having a threaded connection with the nut 90 fastened as by a screw 91 to the bed 2. The main slide 8 is provided with suitable bearing means for supporting this shaft 89 which is immovable in the direction of its axis of rotation with respect to the main slide 8. It, therefore, follows that if the shaft 89 be rotated, it will be moved longitudinally by the stationary nut 90, the direction of longitudinal movement of said shaft depending upon the direction in which said shaft 89 is turned. This shaft, however, during grinding is intermittently always turned in one direction so as to effect the step-by-step movement of the slide 8 toward the tool or wheel 3. When the travel of the table or slide 9 in either direction has been practically completed, the oscillatory actuator 73 will be swung over through the primary agency of one of the dogs 75 and 76 to effect through the intermediate parts a complete oscillation of the rocker 80. On the advance of the rocker 80 the pawl 83 will feed the ratchet wheel 82, but on the return of the rocker the pawl will ride idly over the teeth of the ratchet wheel. When the ratchet wheel 82 is fed by the pawl, it acts through the intermediate described parts to effect the movement of the main slide 8 with the work thereon toward the tool 3, this action continuing until the point or tooth of the pawl 83 rides up on the adjustable guard 92 as familiar in this art. When the pawl does rest on the guard, further inward movement of the main slide 8 is stopped, longitudinal movement of the auxiliary slide 9 should the same be in action at this time, accomplishing nothing, the cut having already been made. The bevel gear 62 is shown as being in mesh with the pinion 94 (Figs 5 and 10) pinned or otherwise secured to the shaft 95 equipped at its front with a hand wheel 96 adapted to be connected at will to the shaft 95 by the clutch member 97. When the hand wheel 96 is clutched to the shaft 95 and when the shaft 58 is at rest, the slide 9 through the intermediate described parts can be adjusted longitudinally of the bed 2. I have described one convenient mechanism by which the work and the tool can be moved relatively toward and from each other and can be moved relatively laterally. The relative movement of the work and the tool toward and from each other in the present instance is in a direction transverse or at right angles to the axis of rotation of the work and the tool, whereas the relative lateral movement of the work and the tool as I have termed it, is in a direction corresponding with these axes, although be necessary, the principal motive in view as will be inferred this may not in all cases being to obtain when required relative movement of the work and the tool in directions transverse to each other.

Figures 10, 11, 12:
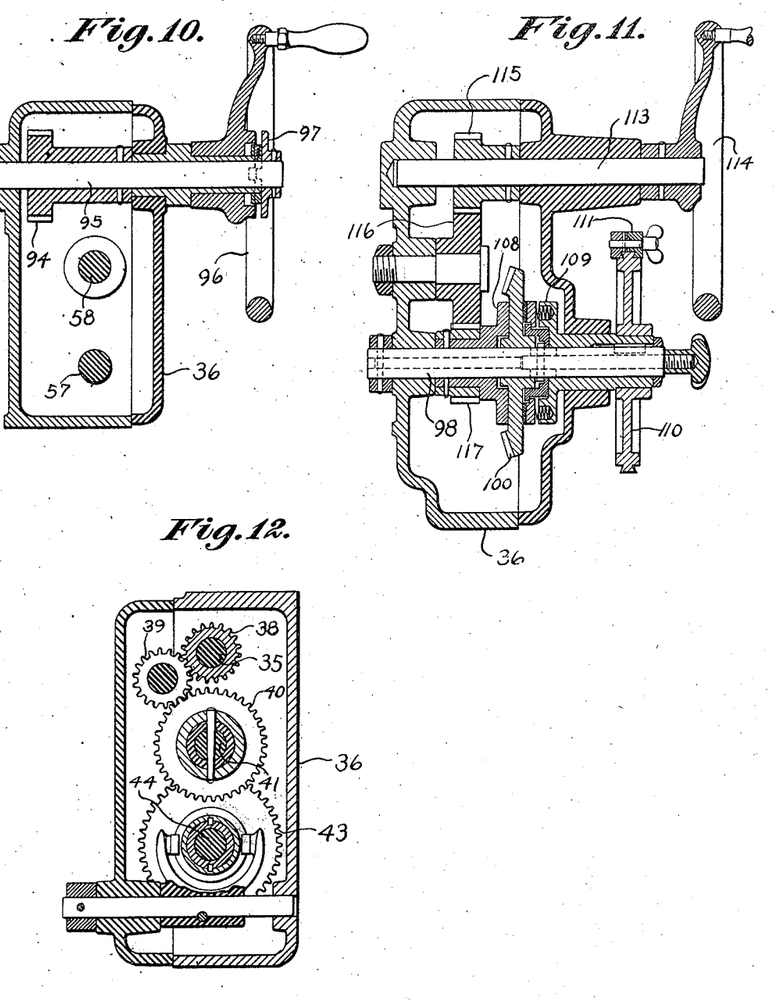
Figs. 10 and 11 are transverse sections on the lines 10—10 and 11—11 respectively of Fig. 1, looking in the direction of the arrows.
Fig. 12 is a cross section on the line 12—12 of Fig. 5, looking in the direction of the arrow.
Figure 13:
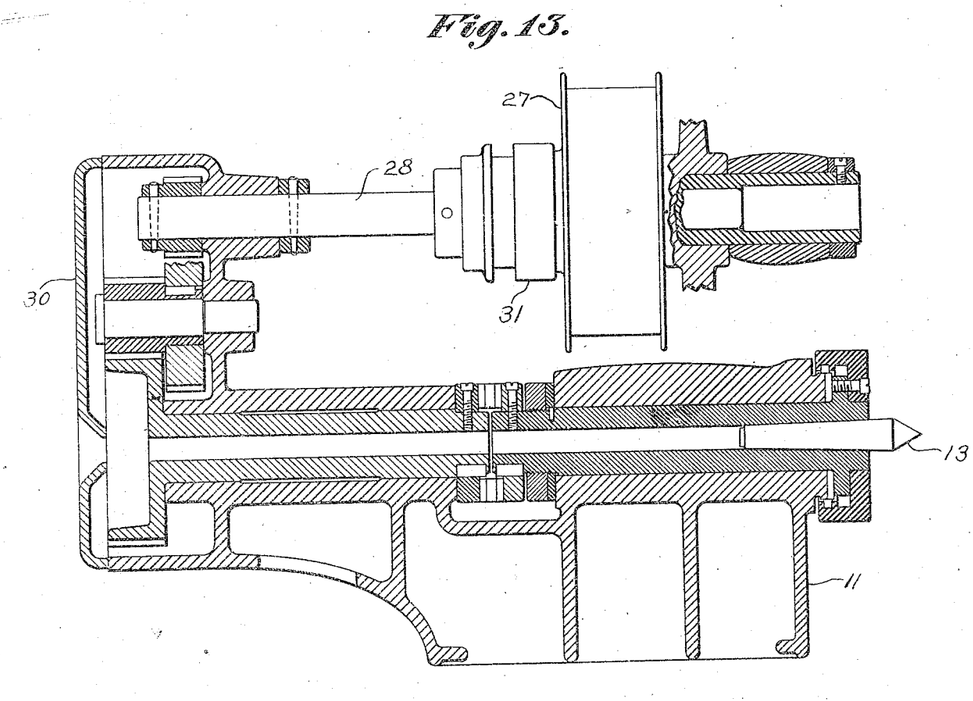
Fig. 13 is a longitudinal section of the live spindle and part of the driving mechanism therefor.

I will now describe convenient mechanism whereby merely the relative movement of the work and the tool toward and from each other can be obtained. The boxing 36 supports the shaft 98 (Fig. 11). Loose on the shaft 98 (Fig. 11) is the bevel gear 100 in mesh with the bevel gear 101 (Fig. 6) which with the spur gear 102 is fastened to the shaft 103. The spur gear 102 in turn meshes with the pinion 104 on the shaft 105. Fastened to said shaft 105 is the spur gear 106 meshing with the pinion 107 on the inner end of the shaft 57 which latter, it will be remembered, is caused to rotate when the clutch member 60 clutches the pinion 55 to the shaft 50. It, therefore, follows that when the shaft 57 is being rotated, the bevel gear 100 through the intermediate parts is turned. This bevel gear 100 rotates between the friction clutch disks 108 and 109 (Fig. 11), both rotative with the shaft 98, and it will be clear therefore, that if no resistance be interposed to the movement of the shaft 98 sufficient to overcome that offered by the coöperative disks 108 and 109, the bevel gear will rotate said shaft 98. Rotative with the gear 100 is the pinion 117 in mesh with the spur gear 88 (Fig. 4) which turns with the screw shaft 89. Rotative with the elongated hub of the disk 109 is the disk 110 carrying on its periphery an adjustable stop coöperative with the fixed stop 112 (Fig. 6). The stop 111 will be adjusted on the disk 110, the desired extent, and the shaft 98 will be caused to rotate through the rotation of the gear 100 to obtain through the intervening parts the motion of the main slide 8 crosswise of the bed 2, this motion continuing until the stop 111 strikes the fixed stop 112 which arrests further motion of the disk 110 and thereby of the shaft 98 and main slide 8, although the bevel gear 100 may continue to rotate, the latter, however, running idly or without accomplishing anything between the coöperative portion of the friction disks 108 and 109.

The boxing 36 is shown provided with a shaft 113 equipped at its front with the hand wheel 114 and within the boxing with a pinion 115. The pinion 115 meshes with the spur gear 116 in mesh with the pinion 117 connected rotatively with the clutch disk 108. When the clutch member 60 is in its neutral position as shown for instance in Fig. 5, or in engagement with the clutch member 55, the hand wheel 114 can be manipulated so as to effect through the described parts the manual adjustment of the main slide 8. This hand wheel 114 is also utilized in the present case to return said main slide 8 to its primary position after the conclusion of a grinding operation.

What I claim is:

1. The combination of means for supporting and rotating the work about a fixed axis, means for supporting a tool, mechanism for automatically causing a relative reciprocation of the work and the tool and a relative motion of the work and the tool toward each other, mechanism for causing a relative motion of the work and the tool toward each other, and means controllable at will, for alternately putting said mechanism into action.

2. The combination of means for supporting and rotating the work about a fixed axis, means for supporting a tool, and means governed at will, for automatically causing a relative reciprocation of the work and the tool and a relative movement of the same toward each other at the conclusion of each stroke of the reciprocation or for automatically causing solely a relative movement of the work and the tool toward each other.

3. The combination of means for supporting and rotating the work about a fixed axis, means for supporting a tool, means for rotating the tool about an axis parallel with the axis of rotation of the work, and means governed at will for automatically causing the reciprocation of the work and a movement of the work toward the tool at the conclusion of each stroke of the reciprocation, or for automatically causing solely a movement of the work toward the tool.

4. The combination of a main slide, an auxiliary slide supported by the main slide, and mechanism governed at will for automatically reciprocating the auxiliary slide and for moving the main slide transversely of the line of reciprocation of the auxiliary slide at the conclusion of each stroke of the reciprocation, or a motion of the main slide in a constant direction transversely of the auxiliary slide.

5. A machine of the class described having a bed, a main slide and an auxiliary slide, the auxiliary slide being supported by the main slide for movement longitudinally of the bed, and the main slide being supported by and movable transversely of the bed, and mechanism governed at will, for automatically reciprocating the auxiliary slide and for moving the main slide at the conclusion of each stroke of the reciprocation or solely the motion of the main slide.

6. A machine of the class described having a bed, a grinding wheel rotatively supported by said bed, a main slide and an auxiliary slide, the main slide supporting the auxiliary slide for movement in a direction parallel to the axis of rotation of the grinding wheel and the main slide being supported by the bed for movement transversely of said axis, mechanism governed at will, for automatically reciprocating the auxiliary slide in the direction of said axis and for moving the main slide transversely of said axis approximately at the conclusion of each stroke of the reciprocation, or a motion of the main slide transversely of said axis, and means for supporting the work on the auxiliary slide, for rotation about an axis parallel to said other axis.

7. A machine of the class described having a bed, a grinding wheel rotatively supported by said bed, a main slide and an auxiliary slide, the main slide supporting the auxiliary slide for movement in a direction parallel to the axis of rotation of the grinding wheel and the main slide being supported by the bed for movement transversely of said axis, and means on the auxiliary slide for supporting the work for rotation about an axis parallel to the axis of rotation of the grinding wheel.

8. The combination of a rotary grinding wheel, a slide movable toward and from the grinding wheel in a direction transverse to the axis of rotation thereof, means connected and movable with said slide, for supporting the work for rotation about an axis parallel to that of the grinding wheel, means involving a frictionally driven element for imparting a constant movement of the slide toward the grinding wheel, and adjustable means for arresting the motion of said frictionally driven element at a predetermined point.

9. The combination of means for supporting a grinding wheel for rotation, means for supporting work about an axis parallel to the axis of rotation of the grinding wheel, a slide carrying one of the supporting means and movable in a direction transverse to said axis, mechanism involving frictional means for imparting a movement of said slide, and adjustable means for arresting the action of one of the elements of said friction means.

10. The combination of a slide, a stationary nut, a feed screw extending through the nut, connected and movable with the slide, a power transmitting member, means for turning said power transmitting member, friction means for transferring the effect of the power transmitting member to the feed screw, and means for arresting the motion of the power transmitting member at a predetermined point.

11. The combination of a slide, a feed screw connected and movable with the slide, a stationary nut through which said feed screw extends, a shaft geared to the feed screw, a gear loose on said shaft, friction means for transferring the effect of the gear to the shaft, and means for rotating said gear.

12. The combination of a main slide, an auxiliary slide on the main slide, feeding mechanism for the main slide, and means governed at will for reciprocating the auxiliary slide and at the conclusion of each stroke of the reciprocation, operating said feeding mechanism to impart an intermittent movement to the main slide, or for continuously operating the feeding mechanism to impart a continuous movement to the main slide.

In testimony whereof I affix my signature in presence of two witnesses.

BENGT M. W. HANSON.

Witnesses:
W. M. STORRS,
HEATH SUTHERLAND.